(12) United States Patent
Revankar et al.

(10) Patent No.: US 7,163,754 B2
(45) Date of Patent: *Jan. 16, 2007

(54) SPROCKET WHEEL HAVING A METALLURGICALLY BONDED COATING AND METHOD FOR PRODUCING SAME

(75) Inventors: Gopal S. Revankar, Moline, IL (US); Timothy D. Wodrich, Peosta, IA (US); Todd B. Niemann, Dubuque, IA (US)

(73) Assignee: Deere & Company, Moline, IL (US)

( * ) Notice: Subject to any disclaimer, the term of this patent is extended or adjusted under 35 U.S.C. 154(b) by 104 days.

This patent is subject to a terminal disclaimer.

(21) Appl. No.: 10/690,566

(22) Filed: Oct. 23, 2003

(65) Prior Publication Data

US 2005/0090347 A1 Apr. 28, 2005

(51) Int. Cl.
*F16H 55/17* (2006.01)
*F16H 55/30* (2006.01)
*C21D 1/10* (2006.01)
*C21D 9/32* (2006.01)
*C22F 1/10* (2006.01)

(52) U.S. Cl. ............... 428/679; 428/680; 305/199; 29/893.37; 148/526; 148/529; 148/537

(58) Field of Classification Search ............ 428/679, 428/668, 680, 682–684, 939; 148/537, 529; 474/152
See application file for complete search history.

(56) References Cited

U.S. PATENT DOCUMENTS

| | | | |
|---|---|---|---|
| 2,271,172 A * | 1/1942 | Heaslet ................. | 474/165 |
| 2,931,094 A * | 4/1960 | Teerlink ................ | 29/893.34 |
| 3,310,870 A | 3/1967 | Parikh et al. | |
| RE27,851 E | 12/1973 | Alessi et al. | |
| 4,042,282 A | 8/1977 | Haslett et al. | |
| 4,175,163 A | 11/1979 | Ikeno et al. | |
| 4,182,394 A | 1/1980 | Cason, Jr. | |
| 4,625,810 A | 12/1986 | Edmisson | |
| 4,682,987 A | 7/1987 | Brady et al. | |
| 4,776,566 A | 10/1988 | Girdley | |
| 4,793,968 A * | 12/1988 | Mosser et al. ............. | 428/550 |
| 4,851,267 A * | 7/1989 | Miyauchi et al. .......... | 427/357 |
| 4,895,310 A * | 1/1990 | Morris, Jr. ............... | 241/200 |
| 4,930,675 A | 6/1990 | Bedford et al. | |

(Continued)

FOREIGN PATENT DOCUMENTS

EP  0 459 637 A1  12/1991

(Continued)

OTHER PUBLICATIONS

Louis R. Hathaway, Ed., *"Tires and Tracks, Fundamentals of Service"*, 1986, pp. 47-67, Sixth ed., Deere & Company, Moline, Illinois.

(Continued)

*Primary Examiner*—John J. Zimmerman
(74) *Attorney, Agent, or Firm*—Buchanan Ingersoll & Rooney, PC

(57) ABSTRACT

A sprocket has a base steel member including an outer toothed profile surface, at least a portion of the outer toothed profile surface having a wear and corrosion resistant coating disposed thereon; the coating comprising an alloy, the alloy comprising at least 60 weight % iron, cobalt, nickel, or alloys thereof. A method of producing a wear and corrosion resistant sprocket includes:
(i) machining a base steel member to form an outer toothed profile surface thereon; (ii) applying a coating to at least a portion of the surface; and (iii) fusing the coating to the base steel member.

28 Claims, 3 Drawing Sheets

U.S. PATENT DOCUMENTS

| | | | |
|---|---|---|---|
| 4,954,058 A | 9/1990 | Revankar | |
| 5,027,878 A | 7/1991 | Revankar et al. | |
| 5,126,104 A | 6/1992 | Anand et al. | |
| 5,267,600 A | 12/1993 | Revankar | |
| 5,288,353 A | 2/1994 | Revankar | |
| 5,299,620 A | 4/1994 | Revankar et al. | |
| 5,383,513 A | 1/1995 | Revankar | |
| 5,425,222 A * | 6/1995 | Crain | 56/8 |
| 5,443,916 A | 8/1995 | Revankar | |
| 5,456,323 A | 10/1995 | Hill | |
| 5,556,078 A * | 9/1996 | Kubota et al. | 254/368 |
| 5,789,038 A * | 8/1998 | Ono | 427/437 |
| 5,879,743 A | 3/1999 | Revankar | |
| 5,897,968 A * | 4/1999 | Dosaka et al. | 428/687 |
| 5,933,955 A | 8/1999 | Barnhart | |
| 6,045,200 A | 4/2000 | Anderton et al. | |
| 6,089,683 A | 7/2000 | Anderton et al. | |
| 6,145,941 A | 11/2000 | Anderton et al. | |
| 6,414,258 B1 | 7/2002 | Amano | |
| 6,846,261 B1 * | 1/2005 | Lev et al. | 475/159 |
| 2003/0168912 A1 | 9/2003 | Wodrich et al. | |

FOREIGN PATENT DOCUMENTS

| | | | |
|---|---|---|---|
| JP | 54-145335 | * | 11/1979 |
| JP | 60-89503 | | 5/1985 |
| JP | 60-89504 | | 5/1985 |

OTHER PUBLICATIONS

Kawasaki Steel Technical Report No. 33, Jan. 1996 entitled "KC-50 Gas Shielded Arc Welding Wire for Robot".

Timothy Woodrich et al., U.S. Appl. No. 11/171,193 entitled "Components of track-type machines having a metallurgically bonded coating" filed Jul. 1, 2005.

* cited by examiner

SPROCKET WHEEL HAVING A METALLURGICALLY BONDED COATING AND METHOD FOR PRODUCING SAME

FIELD OF THE INVENTION

The present invention relates generally to sprocket wheels and methods of producing them. In particular, it relates to sprocket wheels having a wear resistant coating that is metallurgically bonded to at least one surface of the sprocket which is subject to wear during operation thereof, and methods of forming such coated sprockets.

BACKGROUND OF THE INVENTION

In the discussion of the state of the art that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

An endless track drive is made up of a number of components such as links, track pin bushings, rollers, track pins and shoes, as well as a sprocket wheel. U.S. Pat. No. 2,271,172 is illustrative of such devices. The content U.S. Pat. No. 2,271,172 is incorporated herein by reference, in its entirety.

The components of endless track drives are subjected to very severe operating environments. For example, debris, soil, rocks and so forth can enter the track and undercarriage of a track-type machine, such as a crawler tractor, during operation. These materials can subsequently accumulate between the engaging surfaces of the track pin bushing and the drive sprocket teeth, pack into the track and tighten the track tension, and/or directly grind, wear, pit, scratch or crack the surfaces of the components. Additionally, the components are subjected to corrosive conditions, which can further exacerbate the above wear mechanisms.

Conventional sprocket wheels are typically formed from hardened steel materials. For example, steel sprocket wheels may have a surface treatment such as carburization, nitriding or other surface hardening procedure applied thereto. However, such surface-hardened steel sprockets still pose certain drawbacks, as such materials and methods can still result in a relatively short service life.

For example, sand can be harder than even surface-hardened steel, thus resulting in abrasion of the component. The above-mentioned surface treatments are not cost-effective solutions for preventing corrosion. Formation of the sprocket gear from a more expensive highly-alloyed steel composition is also not a fully acceptable solution because even hardened highly-alloyed steels are susceptible to abrasion by contact with sand. Moreover, such highly-alloyed steels are not economical.

U.S. Pat. No. 5,933,955, the entire content of which is incorporated herein by reference, discloses a method of making a drive sprocket which involves water-jet machining the sprocket teeth so as to leave the homogeneity of the composition and structure of the metal material unaffected, followed by selective surface hardening.

U.S. Pat. No. 6,414,258, the entire content of which is incorporated herein by reference, describes a technique for forming a weld overlay on a sprocket and/or bushing surface. According to this patent, an arc electrode is applied to a base metal, forming a "weld pool" on the surface thereof. Cemented carbide particles are then fed into the weld pool, which subsequently solidifies, leaving a bead-like formation on the surface of the part. This approach has certain disadvantages. The above-described procedure is tedious, time-consuming and costly. The treated surface resulting from this procedure is a relatively rough sinusoidal surface. Moreover, the cemented carbide particles are relatively expensive materials.

U.S. Pat. No. 5,879,743, the entire content of which is incorporated herein by reference, discloses a process for hardfacing a machine component by applying a slurry containing an alloy to the surface of the base metal, then fusing or metallurgically bonding the coating to the base material. The process described in this patent is not specifically adapted to produce an improved sprocket wheel component.

U.S. Patent Application Publication No. 2003/0168912 A1, the entire content of which is incorporated herein by reference, describes a process for applying a slurry coating to operative surfaces of track bushings, then fusing or metallurgically bonding the coating to the base metal of the component. Testing of track bushings treated as described therein has demonstrated that this technique is a cost-effective method of increasing wear and corrosion resistance of these components.

However, track bushings contact sprocket gear wheels in the above-described endless track drive mechanisms. The service life of conventional sprocket gear wheels are not seen as being able to match that of the above-described improved bushings. Thus, the overall service life of the endless track drive mechanism is unnecessarily limited by current sprocket wheel constructions.

Therefore, there is a need to provide a sprocket wheel with improved service life and performance characteristics.

SUMMARY OF THE INVENTION

In general, the present invention involves a process for improving the wear and corrosion resistance of a sprocket. The process includes applying a relatively thick layer of hardfacing material to the selected surfaces of the sprocket, heating the coated sprocket, preferably in a hydrogen or argon-containing atmosphere, to fuse the hardfacing material to the sprocket. After the hardfacing material has been fused, the sprocket is heat treated, quenched and tempered to provide the underlying steel with layer or zone of increased wear resistance. The present invention also includes a sprocket formed as generally described above. Namely, a sprocket formed from a base steel material having a coating of hardfacing material applied to at least selected surfaces thereof, wherein the underlying base steel of the sprocket also has a layer or zone of increased wear resistance located on at least those surfaces which are most prone to wear and/or corrosion.

Accordingly, the present invention provides a sprocket comprising: a base steel member comprising an outer toothed profile surface, at least a portion of the outer toothed profile surface having a wear and corrosion resistant coating disposed thereon; the coating comprising an alloy, the alloy comprising at least 60 weight % iron, cobalt, nickel, or alloys thereof.

According to another aspect, the present invention provides a method of producing a wear and corrosion resistant sprocket, the comprising: (i) machining a base steel member to form an outer toothed profile surface thereon; (ii) applying a slurry coating to at least a portion of the surface; and (iii) fusing the slurry coating to the base steel member.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION

Figure 1:
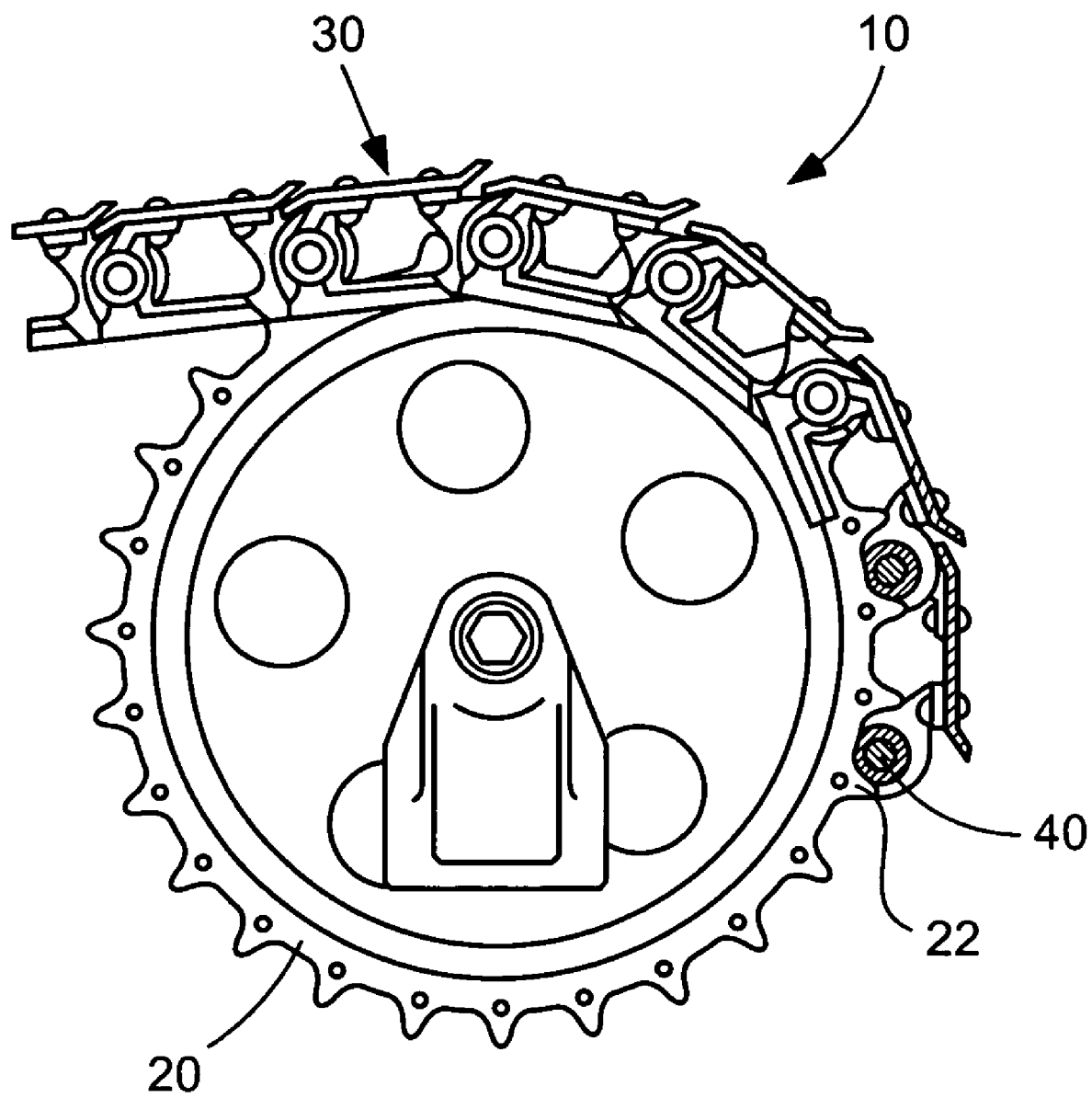
FIG. 1 is a partial plan view of pertinent components of an undercarriage assembly constructed according to the principles of the present invention.

As illustrated, for example, in FIG. 1, an undercarriage assembly 10 which is commonly used as a drive mechanism for a crawler-type tractor, includes a sprocket wheel 20 which drives an endless track member 30 via engagement of the sprocket teeth 22 with track pin/bushing assemblies 40.

Figure 2:
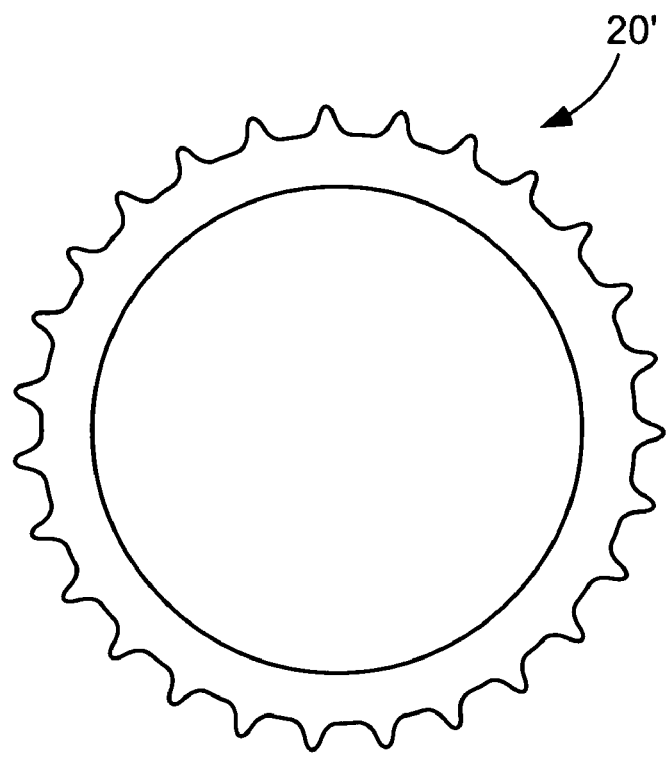
FIG. 2 is a plan view of a one-piece sprocket wheel constructed according to the principles of the present invention.
Figure 3:
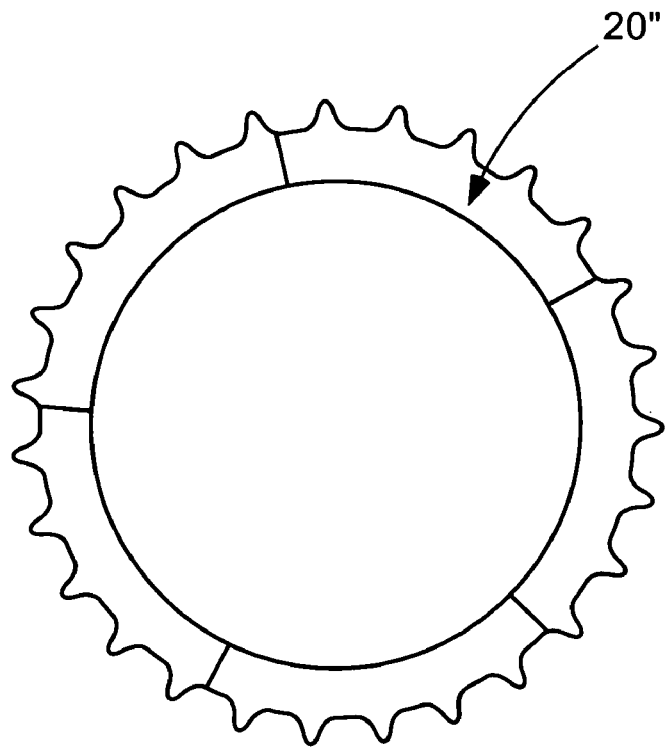
FIG. 3 is a plan view of a sprocket wheel constructed from a plurality of arcuate segments formed according to the principles of the present invention.

As illustrated in FIG. 2, the sprocket wheel can be formed as a one-piece ring member 20'. Alternatively, the sprocket wheel can be formed by joining a plurality of arcuate segments 20". According to the present invention, a sprocket wheel 20 is formed by a unique method to provide a unique construction which enhances the performance and service life thereof.

Figure 4:
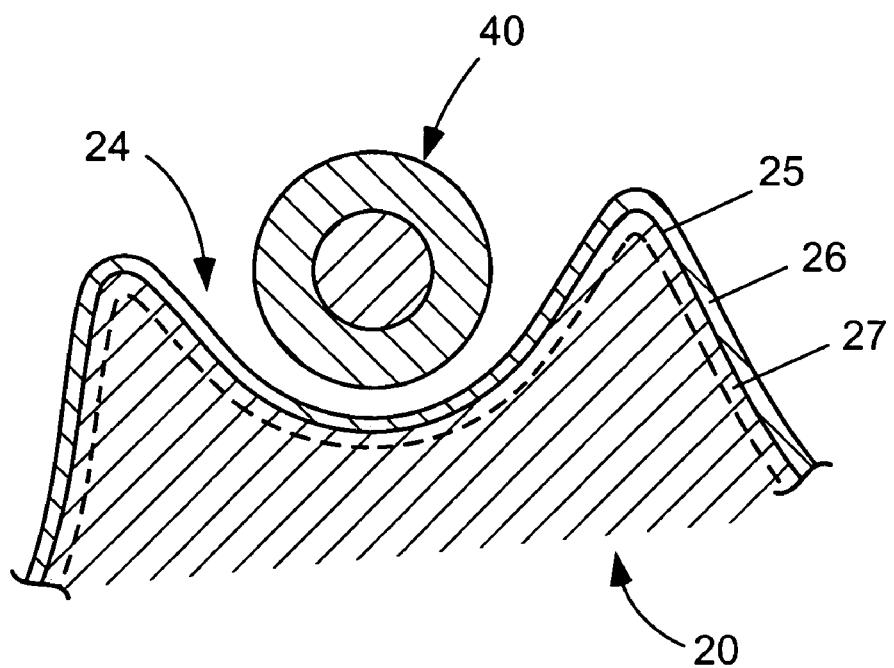
FIG. 4 is a partial cross-sectional view of a sprocket wheel formed according to the principles of the present invention.

As illustrated in FIG. 4, a sprocket wheel 20 formed according to the present invention is formed from a base steel member which has an outer-toothed profile 24 constructed for engagement with track pin/bushing assemblies 40. An outer surface 25 of the base metal member from which the sprocket wheel 20 is constructed is provided with a layer of wear and corrosion resistant material 26. The layer 26 is provided on at least those surfaces of the outer-toothed profile 24 which normally come into contact with the track pin/bushing assemblies 40. In the illustrated embodiment, the layer 26 is provided along the entirety of the outer-toothed profile 24. As explained in further detail below, the sprocket wheel 20 is also provided with a hardened surface zone 27 extending from the outer surface 25 in a radially inward direction. A suitable thickness for the layer 26 is on the order of 1–2 mm. However, the thickness of the layer 26 can be varied, depending upon various factors, such as service conditions, manufacturing requirements and constraints, etc. A suitable thickness for the surface zone 27 is approximately 1.0 to 1.5 mm, but can likewise vary.

The layer 26 is a material that is both wear and corrosion resistant, such as a fused alloy that is substantially harder and more wear-resistant than the base steel member, e.g., 1045 grade steel, even in the hardened conditioned. Further, the layer 26 preferably contains substantially no inclusions, such that the wear-resistant coating is uniformly dense, less brittle and more durable.

Commonly owned U.S. Pat. No. 5,879,743, the entire contents of which are incorporated herein by reference, discloses such a wear-resistant alloy. Additionally, slurry and coating techniques suitable for use in the present invention are disclosed. For example, the fusible hard metal alloy in exemplary embodiments is preferably at least 60% of a transition metal of Group VIII of the Periodic Table, such as iron, cobalt, or nickel. However, the hard metal alloy may be based on other metals so long as the alloys have the physical properties stated above. Minor components (about 0.1 to about 20 wt. %) typically are boron, carbon, chromium, iron (in nickel and cobalt-based alloys), manganese, nickel (in iron and cobalt-based alloys), silicon, tungsten, molybdenum, one or more carbide forming elements, or combinations thereof. Elements in trace amounts (less than about 0.1 wt. %), such as sulfur, may be present as de minimis contaminants. In exemplary embodiments, the alloy has a Vickers Hardness (HV) as high as 950 to 1250 HV. The hard metal alloy has a fusion temperature which is lower than the melting point of the metal that is to be coated, e.g., about 1110° C. or less, and is preferably, between about 900° C. and about 1200° C.

In an exemplary method, the base metal member is machined to a desired shape or profile. The metal can be removed by any suitable technique, such as machining, cutting, lathing, grinding, and polishing. The exposed portion defines an area to be coated.

Figure 5:
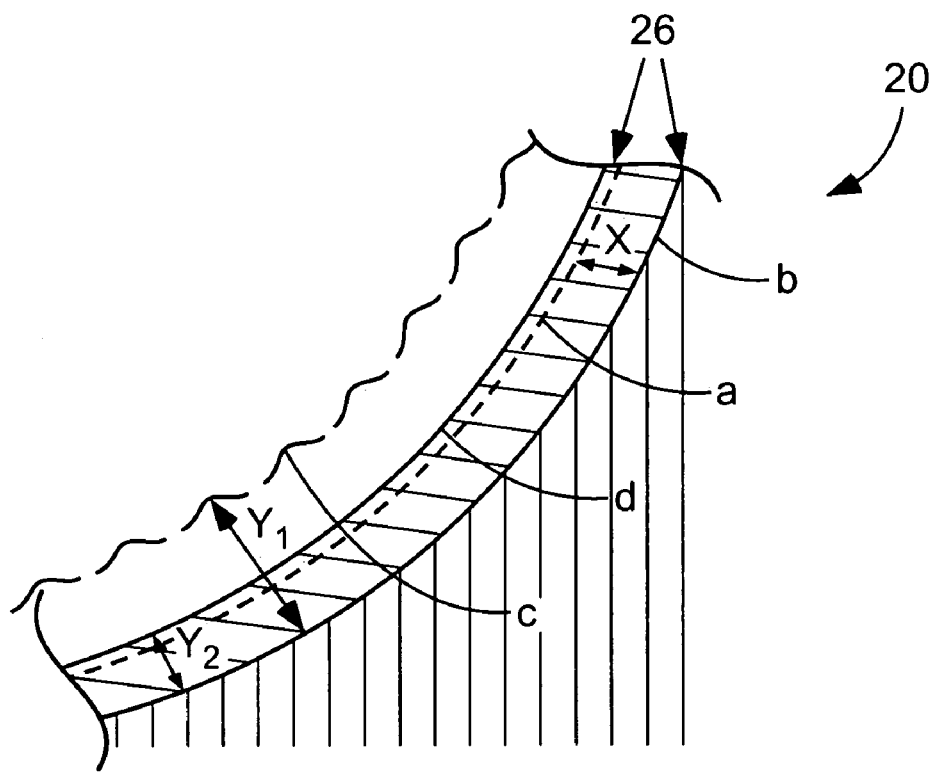
FIG. 5 is a partial sectional: view of the details of a portion of a toothed profile formed by a method of the present invention.

As illustrated in FIG. 5, a machined surface b formed according to the principles of the present invention can be described as being undercut by a dimension x when compared with the normal outer profile or surface a of a conventional, uncoated sprocket wheel.

A coating of a hard metal alloy is then applied on this area and a metallurgical bond is formed between the base metal member and the coating by fusing the hard metal alloy, thereby forming a wear and corrosion-resistant coating.

As further illustrated in FIG. 5, the as-coated unfused layer c has a first thickness $y_1$. As a result of the fusing process, and optional subsequent machining, the layer 26 has an outer surface d with a thickness of $y_2$. Surface d, in the illustrated embodiment, closely coincides with surface a. As the drawing is not to scale, any differences between surfaces a and d may be exaggerated. The decrease in thickness of the slurry coating from its as-coated dimension, to its final fused, and optionally machined, dimension $(y_1-y_2)$ is due to aforementioned shrinkage experienced during the fusing operation, as well as any optional machining, which would further reduce the thickness of the layer 26.

A suitable slurry can be aqueous-based and contain polyvinyl alcohol (PVA) and a fusible, hard metal alloy in the form of a finely divided powder. Examples of a suitable slurry are disclosed in commonly owned U.S. Pat. No. 5,879,743, the entire contents of which are incorporated herein by reference. Other additives may be added to promote suspension of powder particles. As discussed herein and disclosed in the '743 patent, the hard metal alloy can be a transition metal of Group VIII of the Periodic Table, such as iron, cobalt, nickel, or alloys thereof. In an exemplary embodiment, the hard metal alloy is in the form of a finely divided powder having a sufficiently small particle size to form a uniform slurry. Typical particle sizes range from about 90 mesh to about 400 mesh. Preferably, the average particle size is finer than about 115 mesh and, most preferably, finer than about 200 mesh. The powder can be a mixture of powders of different particle sizes.

Further, the slurry used is prepared by thoroughly mixing the powdered, hard metal alloy with the polyvinyl alcohol binder solution to give the desired alloy to binder solution weight ratio, as described in commonly owned U.S. Pat. No. 5,879,743, the entire contents of which are incorporated herein by reference. Other additives maybe added to promote suspension of powder particles.

The slurry can be applied in any suitable manner. For example, the slurry can be spray coated, spun cast, dipped, poured, or spread, i.e., applied with a brush or a doctor blade.

In one exemplary embodiment of a method for hardfacing a metal surface with a wear and corrosion-resistant coating, a substantially uniform aqueous slurry of polyvinyl alcohol and a fusible, hard metal alloy in the form of a finely divided powder is formed and coated on the metal surface. The aqueous slurry is then dried, preferably by applying external heat, to leave a solid layer of the fusible, hard metal alloy in a polyvinyl alcohol matrix on the metal surface. The steps of coating the metal surface and drying the slurry to leave a solid layer may be repeated one or more times to build up a thicker coating of the slurry material.

Prior to coating, the base metal part can be heated to a suitable temperature (e.g.—approximately 300° F.).

In another exemplary embodiment of a method for hardfacing a metal surface with a wear-resistant coating, the metal surface is coated with an aqueous polyvinyl alcohol solution and a substantially uniform layer of a fusible, hard metal alloy in the form of a finely divided powder is distributed onto the coating of the polyvinyl alcohol solution before the polyvinyl alcohol solution dries. The steps of coating the metal surface, distributing the fusible hard metal alloy, and drying the slurry or the solution coating to leave a solid layer may be repeated one or more times to build up a thicker coating of the slurry material.

In an exemplary embodiment of the method of the present invention, the preferred procedure for applying a slurry to the metal surface to be coated depends on the shape and size of the metal item having the metal surface as well as the ratio of hard metal alloy and the concentration of the polyvinyl alcohol binder solution. Typically, the unfused slurry is poured, brushed, or sprayed on the metal surface to be protected, or the item having the metal surface to be protected can be dipped into the unfused slurry.

Dipping, pouring, and brushing is useful for forming relatively thick coatings, e.g., greater than 1 mm, in a short period of time, although repeated spaying can also be used to build up a thick layer over a longer period of time. For these procedures, preferably the ratio of hard metal alloy to PVA solution is in the range of about 4:1 to about 8:1 and the concentration of PVA solution is about 1% to about 15% PVA by weight. For example, 0500/0250 and 0600/0250 or similar slurries are suitable for this procedure. The representation xxxx/yyyy indicates the slurry parameters, where xxxx=weight ratio of powdered alloy to polyvinyl alcohol and yyyy=weight percent of polyvinyl alcohol present in the aqueous solution as a binder. Note that a decimal point is implicit after the first two digits in the representation. Thus, 0500 represents 5.0. Thick slurry compositions, i.e., a high ratio of alloy to PVA solution, can be applied as a squeezable paste, or can be rolled into tapes for bonding to the metal surface. For these procedures, preferably the ratio of alloy to PVA solution is in the range of about 8:1 to about 15:1 by weight and the concentration of PVA solution is about 2% to about 15% PVA by weight. In the above procedures, special additives can function as dispersants, suspending agents, and plasticizers.

In addition to the above methods of applying the coating, paste and tape methods can be used for thick coatings. Accordingly, when a thick coating is desired, a reliable and economical alternative to paste and tape is a multiple coating procedure which produces uniformly thick slurry coatings even on large surfaces. The required thickness can be built by repeated spraying with intervening drying cycles. The drying may be done at about 80° to about 120° C. in, for example, a forced circulation air oven. A 0500/0250 slurry is particularly suitable for this method, though other formulations may be used.

The thickness of the unfused coated can be adjusted by a shrinkage factor to obtain the desired final coating thickness after metallurgical bonding. For example, a fairly typical shrinkage factor is about 0.55±0.05. This factor can vary depending upon the method by which the slurry is applied. Accordingly, the thickness of the coating before fusing can be adjusted according to the shrinkage factor to result in a desired final thickness of the wear and corrosion-resistant coating, e.g.—an unfused coating layer of 1.67 to 2.0 times the final thickness is used.

Bonding is the step of forming a metallurgical bond between the dried coating and the base metal part. For example, the metal surface coated with the layer of fusible, hard metal alloy in the polyvinyl alcohol matrix or coated with the aqueous polyvinyl alcohol solution with the layer of fusible, hard metal alloy can be heated to the fusing temperature of the hard metal alloy under a protective atmosphere until the hard metal alloy has fused onto the surface of the base metal member. Heating occurs in a controlled atmosphere, i.e., an inert or reducing atmosphere, excluding nitrogen which nitrides the alloy. For example, a partial pressure on the order of 100–400 microns of He or Ar in a vacuum furnace forms a slight positive pressure, or Ar, He or $H_2$ at a few inches of positive water pressure in a belt furnace are suitable for use during fusing. Subsequently, the metal surface with the fused hardfacing is cooled to ambient temperature.

In one example of the bonding process, the sprocket wheel or segment is heated at a temperature of about 1110° C. The heating is done in a belt type conveyor furnace at a hydrogen pressure slightly above atmospheric, and the wheel or segment is held at about 1065° C. to about 1075° C. for approximately 2–10 minutes, depending on the mass of the sprocket, and then cooled.

Subsequent to fusing, the wear and corrosion-resistant coating may be smooth enough for use without further machining, which represents another advantage of the present invention. However, it may be desirable to perform subsequent machining in some instances.

In a further aspect, after metallurgically bonding the coating to the base metal part to form the wear and corrosion-resistant coating, the sprocket wheel or segment can be hardened to a desired depth by a suitable technique. For example, the sprocket wheel can be hardened by a thermal treatment that includes induction hardening. While numerous techniques are possible, one suitable technique includes induction heating followed by quenching and tempering thereby producing the desired hardness and toughness in the base metal.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A sprocket comprising:
    a base steel member comprising an outer toothed profile surface, at least a portion of the outer toothed profile surface having a wear and corrosion resistant coating disposed thereon;
    the coating comprising an iron-based alloy, the iron-based alloy comprising at least 60 weight % iron, and nickel,
    wherein the base steel member comprises a surface hardened zone extending inwardly from the outer toothed profile surface, and wherein the surface hardened zone is formed by induction hardening the coated base steel member.

2. The sprocket of claim 1, wherein the base steel member comprises a medium carbon content steel.

3. The sprocket of claim 1, wherein the coating has a thickness of 1–2 mm.

4. The sprocket of claim 1, wherein the coating is metallurgically bonded to the base steel member.

5. The sprocket of claim 1, wherein the base metal member comprises a one-piece ring.

6. The sprocket of claim 1, wherein the base metal member comprises an arcuate segment.

7. The sprocket of claim 1, wherein the base metal member comprises a plurality of arcuate segements.

8. An undercarriage assembly of a crawler-type tractor, the assembly comprising the sprocket of claim 1.

9. A method of producing a wear and corrosion resistant sprocket, the comprising:
    (i) machining a base steel member to form an outer toothed profile surface thereon;
    (ii) applying a wear and corrosion resistant coating to at least a portion of the outer toothed profile surface, the coating comprising an iron-based alloy comprising at least 60 weight % iron, and nickel;
    (iii) fusing the coating to the base steel member; and
    (iv) subsequent to (iii), heat treating the sprocket by induction hardening such that the base steel member comprises an induction hardened, surface hardened zone extending inwardly from the outer toothed profile surface.

10. The method of claim 9, wherein step (i) comprises at least one of milling, grinding and polishing.

11. The method of claim 9, wherein step (i) comprises machining the base steel member such that the outer surface is provided with a dimension which is less than a desired final outer dimension of the finished coated sprocket by an amount corresponding to the desired thickness of the fused coating.

12. The method of claim 9, wherein the base steel member comprises a one-piece ring.

13. The method of claim 9, wherein the base steel member comprises an arcuate segment.

14. The method of claim 9, wherein the coating is applied in the form of a slurry comprising the alloy.

15. The method of claim 14, wherein step (ii) comprises spraying the slurry onto at least a portion of the surface.

16. The method of claim 14, wherein step (ii) comprises dipping the base metal member into the slurry.

17. The method of claim 9, further comprising the step of heating the base metal member prior to step (ii).

18. The method of claim 17, wherein based metal member is heated to approximately 300° F.

19. The method of claim 14, wherein step (ii) comprises multiple applications of the slurry coating.

20. The method of claim 19, wherein the sprocket is heated between applications of the slurry coating.

21. The method of claim 9, wherein the method further comprises machining the coating to remove excess material prior to step (iii).

22. The method of claim 9, wherein step (iii) comprises heating the base metal member in a belt-type furnace.

23. The method of claim 22, wherein step (iii) further comprises heating the base metal member in a hydrogen-containing atmosphere.

24. The method of claim 9, wherein step (iii) comprises heating the base metal member in a vacuum-type furnace.

25. The method of claim 24, wherein step (iii) further comprises heating the base metal member in an argon-containing environment.

26. The method of claim 9, wherein no further machining of the coating is performed prior to placing the sprocket into service.

27. The method of claim 9, wherein the subsequent heat treatment further comprises quenching and tempering.

28. A sprocket comprising:
    a base steel member comprising an inner peripheral surface and an outer toothed profile surface, at least a portion of the outer toothed profile surface having a wear and corrosion resistant coating disposed thereon;
    the coating comprising an iron-based alloy, the iron-based alloy comprising at least 60 weight % iron, and nickel,
    wherein the base steel member comprises a surface hardened zone which is formed by induction hardening the base steel member having the coating thereon such that the surface hardened zone extends inwardly from the outer toothed profile surface to a depth spaced from the inner peripheral surface.

* * * * *